Patented Nov. 9, 1943

2,333,927

UNITED STATES PATENT OFFICE 2,333,927

TERTIARY AMYL ALCOHOL-FORMALDEHYDE CONDENSATION PRODUCT AND METHOD FOR PREPARING THE SAME

Mortimer T. Harvey, East Orange, N. J., assignor to Harvel Research Corporation, a corporation of New Jersey No Drawing. Application October 10, 1942, Serial No. 461,597

6 Claims. (Cl. 260—638)

This invention relates to methods of making condensation products of tertiary aliphatic alcohols and formaldehyde and to the products of such methods. The present application is a continuation in part of my copending application, Serial No. 216,477, filed July 29, 1938, which in turn is a continuation in part of my copending application, Serial No. 190,038, filed February 11, 1938.

Heretofore, it has been proposed to react tertiary aliphatic alcohols with formaldehyde under anhydrous conditions and in the presence of a mineral acid. In Example 6 of the United States patent to Ellis, 2,143,870, the patentee describes the treatment under anhydrous conditions of tertiary butyl alcohol with trioxymethylene in the presence of hydrochloric acid and claims to have obtained di-tertiary-butyl formal.

I have discovered that novel products may be obtained by employing new methods of treating a tertiary alcohol with formaldehyde. According to my novel methods, the tertiary aliphatic alcohols which include tertiary butyl, amyl and hexyl alcohol for example, are treated with an aqueous solution of formaldehyde in the presence of a mineral acid. By employing these methods, I have found that one mole of the alcohol will completely react with more than one mole and with as high as about four to seven moles of the formaldehyde in aqueous solution. In the course of my experimentations, I have discovered that when a mixture of a tertiary aliphatic alcohol and aqueous solution of formaldehyde is heated in the presence of a catalyst such as a mineral acid, the formaldehyde and the alcohol react to produce a product which continues to react with the formaldehyde notwithstanding the presence of unreacted alcohol. This reaction continues until more than one mole of the formaldehyde has completely reacted with one mole of the alcohol, where the mole ratio of formaldehyde to the alcohol is greater than one and even in those cases where equimolecular proportions of the alcohol and formaldehyde are used and also in those cases where the alcohol and formaldehyde in aqueous solution were present in the ratio as low as two to one. According to this invention, it has been found preferable to employ one to eight moles of formaldehyde in aqueous solution to one part of the alcohol. When the eight or more moles of formaldehyde in aqueous solution was employed with one mole of the alcohol, it was found that it was in excess of that which would react with the alcohol and therefore a proportion thereof was present at the end of the reaction period.

The methods of the present invention and the products thereof can be disclosed best by showing how they are produced, for which the following are given as illustrative examples.

*Example 1.*—One mole of formaldehyde and one mole of a tertiary butyl alcohol at atmospheric pressure.

| | Grams |
|---|---|
| 40% water solution HCHO | 425 |
| Tertiary butyl alcohol | 370 |
| 50% sulphuric acid | 100 |

The formaldehyde, tertiary butyl alcohol, sulphuric acid and water in the above listed amounts were dissolved together and heated to boiling under a reflux condenser for about six hours, after which the reaction mixture was neutralized with forty grams of sodium hydroxide. The neutralized mixture separated into two layers and the top layer, after being separated from the bottom layer, was distilled fractionally, one of the fractions being a large quantity of tertiary butyl alcohol. No formaldehyde could be detected in the products of the reaction. The fraction above 120° C. contained the hydroxyl group and had a pleasant odor. It was soluble in alcohol, benzene and water and insoluble in gasoline. A fraction between 230° C. and 250° C. contains the hydroxyl group, has a pleasant odor and an analysis for carbon, hydrogen and oxygen gave the following results:

C: 78.03%
H: 10.97%
O: 11.00% (by difference)

This analysis closely approximates the empirical formula $C_9H_{16}O$.

*Example 2.*—One mole of formaldehyde and one mole of tertiary butyl alcohol at a pressure of about one hundred pounds per square inch.

| | Grams |
|---|---|
| 40% solution HCHO | 510 |
| Tertiary butyl alcohol | 444 |
| 50% sulphuric acid | 100 |

The above three materials in the amounts stated were dissolved together, placed in an autoclave and heated at a pressure of about one hundred pounds for about three hours, and the reaction products neutralized with sodium hydroxide, or neutralized with potassium carbonate, the resulting top oily layer separated from the water solution, and was distilled. A fraction, boiling up to about 120° C. and containing tertiary butyl alcohol, represented about two-thirds of the total theoretical yield, and had a specific gravity of 0.886. This fraction dissolves ethyl cellulose and cellulose nitrate very readily and can be used as a solvent for these materials. It can also be used in combination with other solvents such as acetone, phthalates and so on for lacquer solvents. Even though this fraction contains tertiary butyl alcohol the above solubility property shows the solvent power of these alcohol-formaldehyde reaction products. The fraction between 150–175° C. gives increased solubility over the lower boiling fraction. Even the material which has been reacted to the stage where it is not soluble in water also shows extreme solvent action toward nitrates, cellulose ethers and cellulose acetate. Where the boiling point is extremely high this solubility may be made use of as a plasticizer for the above mentioned materials together with resins, oils, varnishes and the like. The higher boiling fractions have a very pleasant odor and may be used as perfume bases, plasticizers for rubber, leather goods, phenolic resins, etc. The fraction taken between 150° C. and 175° C. on analysis gave the following:

$$C: 59.66\%$$
$$H: 10.53\%$$
$$O: 29.81\% \text{ (by difference)}$$

This analysis closely approximates the empirical formula $C_5H_{12}O_2$. A fraction taken between 200° C. and 210° C. has a specific gravity of 0.98, contains hydroxyl group, and analysis shows the following:

$$C: 59.34\%$$
$$H: 10.86\%$$
$$O: 29.80\% \text{ (by difference)}$$

This analysis closely approximates the empirical formula $C_{10}H_{24}O_4$.

*Example 3.*—Two moles of formaldehyde and one mole of tertiary butyl alcohol at atmospheric pressure.

| | Grams |
|---|---|
| 40% water solution HCHO | 425 |
| Tertiary butyl alcohol | 185 |
| 50% sulphuric acid | 122 |

The above three materials in the amounts stated were dissolved together and refluxed at the boiling point of the mixture for about six hours, neutralized and the top oily layer separated from the bottom water layer as described in examples above. No formaldehyde was detected after the reaction. The top layer was oily in appearance and to the feel and had a specific gravity of 1.02.

*Example 4.*—Two moles of formaldehyde and one mole of tertiary butyl alcohol at a pressure of about one hundred pounds.

| | Grams |
|---|---|
| 40% water solution HCHO | 680 |
| Tertiary butyl alcohol | 300 |
| 50% sulphuric acid | 20 |

The above three materials in the amounts stated were dissolved together, placed in an autoclave and heated at a pressure of about one hundred pounds per square inch for about three hours, and the resulting reaction products neutralized, separated from the water layer and distilled. Fractions taken between 200° C. and 270° C. had specific gravities of from 1.03 to 1.06. They were all soluble in alcohol, benzene, and water but were insoluble in gasoline.

*Example 5.*—Three moles of formaldehyde and one mole of tertiary butyl alcohol, at atmospheric pressure.

| | Grams |
|---|---|
| 40% water solution HCHO | 765 |
| Tertiary butyl alcohol | 222 |
| 50% sulphuric acid | 200 |

The above three materials, in the stated amounts, were dissolved together and heated to boiling under a reflux condenser for about three hours, at which time all odor of formaldehyde had disappeared. The reaction mixture was neutralized with about eighty grams of sodium hydroxide, and the reaction products which rose to the top were separated from the bottom layer of salt solution, dehydrated with sodium carbonate and distilled in vacuum (about 10 mm. of mercury). A cut which distilled between 215° C. and 280° C. (atmos. press.) had a specific gravity of 1.09. It was soluble in alcohol, benzene and water, but was insoluble in gasoline.

*Example 6.*—Three moles of formaldehyde and one mole of tertiary butyl alcohol at atmospheric pressure.

| | Grams |
|---|---|
| A 40% water solution HCHO | 255 |
| Tertiary butyl alcohol | 74 |
| Hydrochloric acid | 10 |

The above three materials, in the stated amounts, were heated to boiling under a reflux condenser for about six hours. After neutralizing the reaction mixture, an upper oily layer was separated from a bottom water layer, dehydrated and distilled. A cut distilling between 175° C. and 260° C. gave on analysis $$C: 58.27\%$$
$$H: 9.62\%$$
$$O: 32.11\% \text{ (by difference)}$$

This closely approximates the empirical formula $C_{10}H_{20}O_4$.

*Example 7.*—Three moles of formaldehyde and one mole of tertiary butyl alcohol at atmospheric pressure.

| | Grams |
|---|---|
| A 40% solution HCHO | 765 |
| Tertiary butyl alcohol | 222 |
| 50% sulphuric acid | 100 |

The above three materials, in the amounts stated, were heated to boiling under a reflux condenser for about six hours, at which time all traces of formaldehyde had disappeared. After neutralizing the reaction mixture, an upper oily layer was separated from a bottom layer of water containing the salts formed by neutralization, dehydrated and distilled. A cut taken between 230° C. and 260° C. (atmospheric pressure) gave the following analysis:

$$C: 57.46\%$$
$$H: 9.28\%$$
$$O: 33.26\% \text{ (by difference)}$$

This approximates the empirical formula of $C_9H_{18}O_4$.

*Example 8.*—Three moles of formaldehyde and one mole of tertiary butyl alcohol at about one hundred pounds pressure per square inch.

| | Grams |
|---|---|
| A 40% water solution HCHO | 765 |
| Tertiary butyl alcohol | 222 |
| 50% sulphuric acid | 5 |

The above three materials, in the stated amounts, were heated under a reflux condenser for about three hours, neutralized and the oily top layer separated and dehydrated, similarly to the treatment in the above examples.

*Example 9.*—Nine moles of formaldehyde and one mole of tertiary butyl alcohol at about one hundred pounds pressure per square inch.

| | | |
|---|---|---|
| A 40% water solution HCHO | grams | 720 |
| Tertiary butyl alcohol | do | 74 |
| Sulphuric acid (conc.) | cc | 0.75 |

The above three materials, in the stated amounts, were heated in an autoclave to one hundred pounds per square inch pressure and held there for one hour. It was then cooled to room temperature. Some odor of formaldehyde still remained. There was no separation of layers. Accordingly, after neutralization, the mixture was subjected to fractional distillation at atmospheric pressure. The residue above 135° C. was a viscous oil.

By removing by distillation from each of the products produced by following Examples 1 to 9, the fraction having a boiling point as high as 135° C., the remaining product in each case is of an oily nature and is soluble in ethyl alcohol and benzene and at least partially soluble in water but substantially insoluble in gasoline. By removing by distillation from each of said remaining products that fraction having a boiling point as high as 250° C., the remaining fraction is also soluble in ethyl alcohol and benzene. While each of these remaining fractions is partially soluble in water, it is less soluble than said remaining product from which it was obtained.

*Example 10.*—One mole of tertiary amyl alcohol and one mole of formaldehyde at atmospheric pressure. About

| | Grams |
|---|---|
| Tertiary amyl alcohol | 88 |
| 40% solution of HCHO in water | 85 |
| 50% sulphuric acid | 40 | were heated together to ebullition under a reflux condenser until a reddish oil layer came to the top and the odor of the formaldehyde disappeared. This top layer was separated and neutralized with dry sodium hydroxide. The neutralized product was insoluble in water, contained a little unreacted tertiary amyl alcohol and had a specific gravity of 0.882. The neutralized product was distilled at atmospheric pressure, distillation commencing at 82° C. From 82° C. to 135° C. a total of 45 grams was distilled. From 135° C. to 193° C. a total of 33 grams was distilled. The latter fraction was soluble in water, alcohol and benzene, insoluble in gasoline, and was a solvent for cellulose acetate.

*Example 11.*—One mole of formaldehyde and one mole of tertiary amyl alcohol at one hundred pounds pressure. About

| Formaldehyde solution (37½% by weight) | grams | 480 |
|---|---|---|
| Tertiary amyl alcohol | do | 528 |
| Sulphuric acid (conc.) | cc | 5.5 |

The acid and formaldehyde solution were mixed together and then the tertiary amyl alcohol was added, in an autoclave. The mixture was heated till the gauge indicated a pressure of 100 pounds per square inch. The pressure tended to rise rapidly at this point, indicating an exothermic reaction. Application of heat was stopped till reaction subsided and pressure commenced to drop. Heat was then re-applied and the burner regulated so as to maintain the pressure at 100 pounds per square inch for one hour. The mixture was cooled and when the autoclave was opened, it was found that the odor of formaldehyde had disappeared. The contents had separated into two layers. Dilute sodium hydroxide solution was added till aqueous layer was neutral and sodium chloride was added to saturation of aqueous layer. The oil layer was then separated. This oil layer was subjected to distillation and a first cut taken up to 88° C. The residue, containing some water, was dehydrated by distillation to 135° C. This also removed any unreacted tertiary amyl alcohol, which boils at 102° C. The distillate separated into two layers, of which the oil layer amounted to 42 grams. The water-free residue, boiling above 135° C. amounted to 350 grams. It was a light-colored, slightly viscous oil, specific gravity 1.03 at 25° C., soluble in water, alcohol and benzene, insoluble in gasoline. It was a quick solvent for cellulose acetate. Upon distillation at atmospheric pressure this oil distilled over almost completely up to 260° C. leaving almost no residue.

*Example 12.*—One mole of tertiary amyl alcohol and two moles of formaldehyde at atmospheric pressure. About

| | Grams |
|---|---|
| Tertiary amyl alcohol | 88 |
| Aqueous formaldehyde solution (37½% by weight) | 170 |
| 50% sulphuric acid | 60 | were mixed together, giving a completely clear solution, and heated under a reflux condenser to ebullition. When ebullition commenced the mixture turned milky and an oil separated to the top immediately. The boiling was carried on for about forty-five minutes at which time no odor of formaldehyde was detectable. The top oil layer was separated and weighed 110 grams. This was distilled at atmospheric pressure. Distillation started at about 87° C. and up to 135° C., a total of 25 grams was distilled off. The remaining dehydrated oil amounted to 85 grams and was a deep yellow, somewhat viscous oil, specific gravity (25° C.) 1.05. It was found to be soluble in water, alcohol and benzene, but insoluble in gasoline. It was a fast solvent for cellulose acetate. Upon further distillation at atmospheric pressure, it was found to distil over almost completely up to 290° C.

*Example 13.*—Three moles of formaldehyde and one mole of tertiary amyl alcohol at 100 pounds pressure.

| Formaldehyde solution (37½% by weight) | grams | 720 |
|---|---|---|
| Tertiary amyl alcohol | do | 264 |
| Sulphuric acid (conc.) | cc | 1.33 |

The acid and formaldehyde solution were mixed together and then the tertiary amyl alcohol was added, in an autoclave. The mixture was heated till the gauge indicated a pressure of 100 pounds per square inch. The pressure tended to rise rapidly at this point indicating an exothermic reaction. Application of heat was stopped till reaction subsided and pressure commenced to drop. Heat was then re-applied and the burner regulated so as to maintain the pressure at 100 pounds per square inch for one hour. The mixture was cooled and when the autoclave was opened it was found that the odor of formaldehyde had disappeared. The contents had separated into two layers. Dilute sodium hydroxide solution was added till aqueous layer was neutral and the oil layer was then separated. This oil layer still contained water and was dehydrated by distillation to a temperature of 135° C. The residual oil weighed 370 grams and had a specific gravity at 25° C. of 1.075. Upon distillation of this residual oil at atmospheric pressure to a vapor temperature of 285° C., it was separated into two portions:

*a.* Distillate (290 grams) which was a pale yellow viscous oil (specific gravity of 1.06), soluble in water, alcohol and benzene, insoluble in gasoline, and it dissolved cellulose acetate quickly.

*b.* Residue (80 grams) which was a dark brown soft pitch, soluble in alcohol and benzene, insoluble in water and gasoline, and also compatible with cellulose acetate.

*Example 14.*—One mole of tertiary amyl alcohol and eight moles of formaldehyde at one hundred pounds pressure. About Tertiary amyl alcohol_____grams__ 132
Formaldehyde solution (37½% by weight) grams__ 960
Sulphuric acid (conc.)_____cc__ 1.0

The acid and formaldehyde solution were mixed together and then the tertiary amyl alcohol was added, in an autoclave. The mixture was heated to 100 pounds per square inch pressure and held there for one hour. It was then cooled to room temperature. A slight odor of formaldehyde remained. There was no separation of layers. Sodium chloride was added to saturation, causing the separation of an oil layer. The aqueous solution still contained considerable oil in solution which could be separated by fractional distillation or by extraction with benzene. The oil layer which separated, amounting to 208 grams (specific gravity 1.050) was distilled to vapor temperature of 135° C. The residue, amounting to 104 grams (specific gravity 1.085) was a brown, viscous oil soluble in alcohol and benzene, partially soluble in water, insoluble in gasoline. The oil residue distilled at atmospheric pressure gave the following results:

| Per cent distilled | 10 | 20 | 30 | 40 | 50 | 60 | 70 | 80 | 90 |
|---|---|---|---|---|---|---|---|---|---|
| Degrees centigrade | 175 | 208 | 230 | 242 | 249 | 255 | 261 | 278 | 290 |

By removing by distillation from each of the products produced by following Examples 10 to 14, the fraction having a boiling point as high as 135° C., the remaining product in each case is of an oily nature and is soluble in ethyl alcohol and benzene and at least partially soluble in water but substantially insoluble in gasoline. By removing by distillation from each of said remaining products that fraction having a boiling point as high as 250° C., the remaining fraction is also soluble in ethyl alcohol and benzene. While each of these remaining fractions is partially soluble in water, it is less soluble than said remaining product from which it was obtained.

*Example 15.*—One mole of tertiary hexyl alcohol and one mole of formaldehyde at one hundred pounds pressure. The tertiary hexyl alcohol used in this and the following examples was diethyl methyl carbinol with a boiling point of 123° C.
About Tertiary hexyl alcohol_____grams__ 306
Formaldehyde solution (37½% by weight)_____do____ 240
Sulphuric acid (conc.)_____cc__ 3.0 were heated together in an autoclave to 100 pounds per square inch pressure and held therefor one hour. The mixture was then cooled to room temperature. No odor of formaldehyde remained. The mixture separated into two layers and was neutralized by the addition of dilute sodium hydroxide. The oil layer, amounting to 329 grams (specific gravity of 0.874 at 25° C.) was distilled to vapor temperature of 135° C. The residue, amounting to 166 grams (specific gravity 0.955) was soluble in alcohol, benzene and gasoline but insoluble in water. A portion of the residue oil distilled at atmospheric pressure gave the following results:

| Per cent distilled | 10 | 20 | 30 | 40 | 50 | 60 | 70 | 80 | 90 |
|---|---|---|---|---|---|---|---|---|---|
| Degrees centigrade | 143 | 155 | 167 | 180 | 195 | 213 | 233 | 244 | 276 |

*Example 16.*—One mole of tertiary hexyl alcohol and three moles of formaldehyde at one hundred pounds pressure.
About Tertiary hexyl alcohol_____grams__ 306
Formaldehyde solution (37½%)____do____ 720
Sulphuric acid (conc.)_____cc__ 1.5 were heated in an autoclave to one hundred pounds per square inch pressure and held there for one hour. The mixture was then cooled to room temperature. No odor of formaldehyde remained. The mixture separated into two layers. It was then neutralized by addition of dilute sodium hydroxide and the top oil layer which separated amounted to 405 grams (specific gravity 0.992). This oil layer was then distilled to vapor temperature of 135° C. The residue amounting to 325 grams (specific gravity of 1.030) was soluble in alcohol, benzene and gasoline but insoluble in water. The distillate was also water insoluble. The residue oil, distilled at atmospheric pressure gave the following results:

| Per cent distilled | 10 | 20 | 30 | 40 | 50 | 60 | 70 | 80 | 90 |
|---|---|---|---|---|---|---|---|---|---|
| Degrees centigrade | 175 | 194 | 210 | 225 | 242 | 253 | 263 | 280 | 300 |

*Example 17.*—One mole of tertiary hexyl alcohol and eight moles of formaldehyde at one hundred pounds pressure.
About Tertiary hexyl alcohol_____grams__ 153
Formaldehyde solution (37½%)____do____ 960
Sulphuric acid (conc.)_____cc__ 0.75 were heated in an autoclave to one hundred pounds per square inch pressure and held there for one hour. The mixture was then cooled to room temperature and a slight odor of formaldehyde remained. The bottom oil layer was neutralized by the addition of dilute sodium hydroxide and separated, yielding 248 grams (specific gravity 1.072). This oil layer was then distilled at atmospheric pressure to a vapor temperature of 135° C. The residue was a brown viscous oil weighing 181 grams (specific gravity 1.090 at 25° C.). The distillate to 135° C. was water soluble. The residue oil, distilled at atmospheric pressure gave the following results:

| Per cent distilled | 10 | 20 | 30 | 40 | 50 | 60 | 70 | 80 |
|---|---|---|---|---|---|---|---|---|
| Degrees centigrade | 234 | 244 | 249 | 254 | 259 | 264 | 278 | 300 |

This residue oil, before distillation, was soluble in alcohol, benzene and gasoline and insoluble in water.

The tertiary hexyl alcohol employed in Examples 15, 16 and 17 may be dimethyl normal propyl carbinol, dimethyl isopropyl carbinol or diethyl methyl carbinol or a combination of two or more of them.

In Examples 15, 16 and 17, the reactions are disclosed as having been carried out at pressures above atmospheric. The same results may be obtained at atmospheric temperature by heating the components thereof to boiling under a reflux condenser for about six hours. The only change in the original constituents is that under atmospheric pressure it is preferable to employ 60, 30 and 15 grams of 50% solution of sulphuric acid respectively in place of the 3, 1.5 and .75 grams of concentrated sulphuric acid.

Although most of the examples presented have utilized sulphuric acid as the mineral acid condensing agent, it has been found that hydrochloric acid can be substituted for the sulphuric acid with no change in either the yield or the properties of the products obtained as shown by a comparison of Examples 6 and 7. There is one exception to this statement. Lighter colored products have resulted from the use of sulphuric acid. The quantity of acid used, it will be noted, varies considerably with the pressure under which the reaction is carried out. At pressures greater than atmospheric pressure much less acid need be used and lighter-colored products are possible.

The most important factor, as regards percentage yield of higher boiling material, as well as specific gravity, is the ratio of formaldehyde to the tertiary alcohol. If the products boiling above 135° C., obtained in accordance with the methods of Examples 11, 12, 13, 15, 16 and 17 are compared, the effect of the formaldehyde will be evident.

Table

| Example No. | Molar ratio of HCHO to alcohol | Yield in per cent of alcohol | Specific gravity | Boiling range of products |
|---|---|---|---|---|
| 11 | 1:1 | 67 | 1.03 | No residue above 260° C. |
| 12 | 2:1 | 97 | 1.05 | No residue above 290° C. |
| 13 | 3:1 | 140 | 1.075 | 21.6% residue above 285° C. |
| 15 | 1:1 | 54 | 0.955 | 80% distilled to 244° C. |
| 16 | 3:1 | 106 | 1.030 | 80% distilled to 280° C. |
| 17 | 8:1 | 118 | 1.090 | 80% distilled to 300° C. |

The higher boiling products obtained by the methods of this invention are new materials and of unknown chemical composition. That they are not merely formals is evidenced from a consideration of the properties of the products obtained and also from the observation that larger amounts of formaldehyde than even equal molecular proportions are condensed with the alcohol in the method of this invention as shown in table above.

The specific gravities of the products boiling above 135° C. obtained by the method of this invention are all close to, or greater than one, whereas the formals of alcohols having from four to six carbon atoms which have been described in the literature, all have specific gravities below 0.85. Thus, according to Arnhold in "Annalen der Chemie," vol. 240, page 203 (1887), the formal of isobutyl alcohol has a density of 0.824 and isoamyl alcohol a density of 0.835.

In addition, there is the difference in solubility in petroleum hydrocarbons. The products obtained by this invention, boiling above 135° C., from tertiary butyl and tertiary amyl alcohols are almost totally insoluble in gasoline whereas the formals of the lower alcohols are appreciably soluble in gasoline. This was determined by actual test with formals obtained on the open market and confirmed by the disclosure in Ellis' Patent No. 2,143,870 where it is pointed out that the formals of the lower alcohols are soluble in gasoline to the extent of at least 5% by volume.

The products boiling above 135° C. obtained in accordance with the methods of the present invention have been found to be solvents for such materials as cellulose nitrate, cellulose acetate, polyvinyl esters and some grades of polyvinyl alcohol. Although the water solubility of some of the products may be a disadvantage in their use as plasticizers or as solvents for various plastics, in other instances where extreme oil resistance is desired, their use is decidedly beneficial. Furthermore, these materials can be made water insoluble without changing their other solvent characteristics by an acylating reaction such as by reaction with acetic anhydride, butyric anhydride, etc.

All of the organic condensation products and all fractions thereof produced in the manner herein disclosed are soluble in ethyl alcohol and benzene and are substantially unaffected by hot dilute mineral acids. And, a yield of condensation products as great as and more than about 100% of the quantity of tertiary alcohol originally present is obtained by said methods when the mole ratio of the formaldehyde in aqueous solution to the tertiary alcohol used is as great as about 3 to 1.

The acylating reactions are carried out with the water soluble products and are especially applicable to the water soluble products in which the tertiary, amyl and butyl alcohols were employed with the aqueous formaldehyde.

The description of the novel methods and products are set forth herein and in the claims.

I claim:

1. The method for producing an organic condensation product being substantially unaffected by hot dilute mineral acid and soluble in ethyl alcohol, comprising heating together from one to eight moles of formaldehyde in aqueous solution and one mole of tertiary amyl alcohol in the presence of a mineral acid until such product is formed.

2. The method for making an organic condensation product soluble in ethyl alcohol and being unaffected by hot dilute mineral acid and whose yield is as great as about 100% of the quantity of tertiary amyl alcohol originally present, comprising heating until said product is obtained at said yield tertiary amyl alcohol and an aqueous solution of formaldehyde in the presence of a mineral acid, the mole ratio of the formaldehyde in said solution to said tertiary alcohol being at least as great as about three to one.

3. The method for making an organic condensation product being soluble in ethyl alcohol and being substantially unaffected by dilute mineral acid, which comprises in the presence of a mineral acid completely reacting one mole of tertiary amyl alcohol with more than one mole of formaldehyde in aqueous solution.

4. The method for making condensation products, which comprises heating together from one to eight moles of formaldehyde in water solution and one mole of tertiary amyl alcohol, in the presence of a mineral acid, and removing therefrom the portion of the condensation products boiling below about 135° C.

5. A product having fractions whose boiling points are above 135° C. and are obtained by heating together from one to eight moles of formaldehyde in water solution and one mole of tertiary amyl alcohol, in the presence of a mineral acid.

6. A product whose boiling point is above 135° C. and obtained by heating together from one to eight moles of formaldehyde in water solution and one mole of tertiary amyl alcohol, in the presence of a mineral acid.

MORTIMER T. HARVEY.